(12) United States Patent
Nichols (10) Patent No.: US 8,213,260 B2
(45) Date of Patent: Jul. 3, 2012

(54) FAST RESIDUAL MIGRATION OF SEISMIC DATA THROUGH PARSIMONIOUS IMAGE DECOMPOSITION

(75) Inventor: David E. Nichols, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 523 days.

(21) Appl. No.: 12/419,844

(22) Filed: Apr. 7, 2009

(65) Prior Publication Data

US 2009/0251995 A1    Oct. 8, 2009

Related U.S. Application Data (60) Provisional application No. 61/043,194, filed on Apr. 8, 2008, provisional application No. 61/043,475, filed on Apr. 9, 2008.

(51) Int. Cl.
*G01V 1/00*    (2006.01)

(52) U.S. Cl. ............................................. 367/38; 367/53

(58) Field of Classification Search .................... 367/38, 367/73, 50, 53
See application file for complete search history.

(56) References Cited

U.S. PATENT DOCUMENTS

| | | | |
|---|---|---|---|
| 5,274,605 A * | 12/1993 | Hill | 367/53 |
| 2004/0136269 A1 | 7/2004 | Mackay | |
| 2006/0056272 A1 | 3/2006 | Hill | |
| 2007/0203673 A1 | 8/2007 | Sherrill et al. | |
| 2007/0271041 A1 | 11/2007 | Peng | |
| 2009/0240438 A1 * | 9/2009 | Wang et al. | 702/14 |

OTHER PUBLICATIONS

Fomel, et al., Poststack Velocity Analysis by Separation and Imaging of Seismic Diffractions, Geophysics, Nov.-Dec. 2007, pp. U89-U94, vol. 72, No. 6.
PCT Search Report, dated Sep. 29, 2009 for Application No. PCT/US2009/039919.
Rocca, et al., Residual Migration, SEG, 1982.
Frank Adler, Kirchhoff Image Propagation, Geophysics, Jan.-Feb. 2002, pp. 126-134, vol. 67, No. 1.
Hua, et al., Parsimonious 2D Prestack Kirchhoff Depth Migration, Geophysics, May-Jun. 2003, pp. 1043-1051, vol. 68, No. 3.
Karel Zacek, Gaussian Packet Pre-Stack Depth Migration, SEG Annual Meeting, Oct. 2004.
Douma, et al., Wave-Character Preserving Pre-Stack Map Migration using Curvelets, SEG Annual Meeting, Oct. 2004.
Gao, et al., Fast Beam Migration—A Step Toward Interactive Imaging, SEG Annual Meeting 2006, pp. 2470-2474.
Chen, et al., Target-Oriented Beamlet Migration Based on Gabor-Daubechies Frame Decomposition, Geophysics, Mar.-Apr. 2006, pp. S37-S57, vol. 71, No. 2.
Why Does the Industry Prefer AGS PSDM?, Applied Geophysical Services, http://www.appliedgeo.com/services.html, Dec. 20, 2007.
Fast Beam Migration, Speed and Quality with Beams and Wavelets, CGG Veritas, http://www0.cgg.com/proserv/processing/Services/FBM/Speed.html, Dec. 20, 2007.
Combined Search and Exam Report of British Application Serial No. 1205717.0 dated May 9, 2012.
Rothman et al., "Residual migration: Applications and limitations," Geophysics, Jan. 1985, vol. 50(1): pp. 110-126.

* cited by examiner

*Primary Examiner* — Mark Hellner (57) ABSTRACT

A technique for performing a fast residual migration of seismic data through parsimonious image decomposition is presented. In one aspect, the technique includes a software-implemented method for processing a set of seismic data includes through parsimonious image decomposition. Other aspects of the technique include a program storage medium encoded with instructions that, when executed by a processor, perform such a method or a computing apparatus programmed to perform such a method.

28 Claims, 8 Drawing Sheets

FAST RESIDUAL MIGRATION OF SEISMIC DATA THROUGH PARSIMONIOUS IMAGE DECOMPOSITION

CROSS-REFERENCE TO RELATED APPLICATIONS

Priority from U.S. Provisional Application Ser. No. 61/043,194, entitled "Fast Residual Migration of Seismic Data Through Parsimonious Image Decomposition", filed Apr. 8, 2008, in the name of the inventor David E. Nichols, is hereby claimed under 25 U.S.C. §119(e). This application is also hereby incorporated by reference for all purposes as if set forth herein verbatim.

Priority from U.S. Provisional Application Ser. No. 61/043,475, entitled "Fast Residual Migration of Seismic Data Through Parsimonious Image Decomposition", filed Apr. 9, 2008, in the name of the inventor David E. Nichols, is hereby claimed under 25 U.S.C. §119(e). This application is also hereby incorporated by reference for all purposes as if set forth herein verbatim.

STATEMENT REGARDING FEDERALLY SPONSORED RESEARCH OR DEVELOPMENT

Not applicable.

BACKGROUND OF THE INVENTION

1. Field of the Invention

This invention disclosure relates to the processing of seismic data, and, in particular, to a technique for performing a fast residual migration of seismic data through parsimonious image decomposition.

2. Discussion of Related Art

This section of this document is intended to introduce various aspects of the art that may be related to various aspects of the present invention described and/or claimed below. This section provides background information to facilitate a better understanding of the various aspects of the present invention. As the section's title implies, this is a discussion of related art. That such art is related in no way implies that it is also prior art. The related art may or may not be prior art. It should therefore be understood that the statements in this section of this document are to be read in this light, and not as admissions of prior art.

Seismic exploration involves surveying subterranean geological formations for hydrocarbon deposits. A survey typically involves deploying acoustic source(s) and acoustic sensors at predetermined locations. The sources impart acoustic waves into the geological formations. The acoustic waves are sometime also referred to as "pressure waves" because of the way they propagate. Features of the geological formation reflect the pressure waves to the sensors. The sensors receive the reflected waves, which are detected, conditioned, and processed to generate seismic data. Analysis of the seismic data can then indicate the presence or absence of probable locations of hydrocarbon deposits.

Once acquired, the recorded seismic data is generally processed to facilitate its end use. A number of techniques are employed depending on the analysis that is to be performed. One such technique is called "fast migration". Many techniques for fast migration using beam decompositions are known to the art. In such a migration, conventional practice often discards many of the beams so to rapidly image important features in the input dataset. It is advantageous to have a "parsimonious" transformation that represents a large amount of the energy in the data with a few coefficients.

Beam formation can be posed as prestack data decompositions in the shot-receiver domains or common offset domain. Or, beam formation can be posed as post migration decompositions in offset or angle domains. These methods are also related to older methods such as Gaussian beam migration.

The goal of the beam decomposition is to represent the data in a more parsimonious form so that the data can be depth migrated more efficiently. Since migration is a process that varies with position and dip it is natural to consider decompositions that have the property of being local in space and dip.

Data migration often uses a ray based method to reposition the energy from the input beams to their final imaged position. The takeoff angles for the rays are given by the dip (or dips) associated with each beam. The position in the final image is strongly dependent on the dip identified in the data. This means that making an accurate estimate of the dip is an important part of the process. In particular it is undesirable to have only a limed number of fixed dips (e.g. equally sampled dips in a range). The goal should be to get the best possible dip estimate from the continuous range of dips.

References directed to these matters include:

Ling Chen, et al., "Target-Oriented Beamlet Migration Based on Gabor-Daubechies Frame Decomposition", 71 Geophysics S37 (2006);

U.S. Patent Publication 2006/0056272, entitled "Methods for Earth Modeling and Seismic Imaging Using Interactive and Selective Updating", filed Sep. 13, 2004, in the name of the inventor N. Ross Hill;

"Applied Geophysical Services", downloaded Dec. 20, 2007, from http://www.appliedgeo.com/services.html;

U.S. Patent Publication 2007/0271041, entitled "Diplet-Based Seismic Processing", filed May 17, 2007, in the name of the inventor Chengbin Peng;

U.S. Provisional Patent Application 60/801,133, entitled "3D Diplet Demigration and Remigration", filed May 17, 2006, in the name of the inventor Chengbin Peng;

Huub Douma, et al., "Wave-character Perserving Pre-Stack Map Migration Using Curvelets", SEG Int'l Exposition and 74 Annual Meeting (Oct. 10-15, 2004);

"CGGVeritas Fast Beam Migration", downloaded Dec. 20, 2007, from http://www0.cgg.com/proserv/processing/Services/FBM/Speed.html;

Fuchun Gao, et al., "Fast Beam Migration—A Step Toward Interactive Imaging", SEG 2006 Annual Meeting;

F. Rocca, "Residual Migration";

Biaolong Hua, et al., "Parsimonious 2D prestack Kirchoff Depth Migration", 68 Geophysics 1043 (2003);

Karel Zacek, "Gaussian Packet Pre-Stack Depth Migration", SEG Int'l Exposition and $74^{th}$ Annual Meeting (Oct. 10-15, 2004); and Frank Adler, "Kirchoff Image Propagation", 67 Geophysics 126 (2002).

The present invention is directed to overcoming, or at least reducing the effects of, one or more of the problems set forth above.

BRIEF SUMMARY OF THE INVENTION

The present invention, as will be discussed further below, includes a technique for performing a fast residual migration of seismic data through parsimonious image decomposition is presented.

In a first aspect, a software-implemented method for processing a set of seismic data comprises: initially migrating the seismic data; decomposing the fully migrated seismic data in space into a plurality of beams; and residually migrating the decomposed beams to form a residually migrated seismic data set.

In a second aspect, a software-implemented method for decomposing migrated seismic data in space comprises: windowing the initially migrated data set into a plurality of windows that sum to unity; applying a matching pursuit scheme by selecting a dominant dip in each of the windows; estimating a reconstructed dipping event for each selected dominant dip; and subtracting the estimated dipping event from the migrated data set.

In a third aspect, a software-implemented method for use in processing seismic data comprises: decomposing an unmigrated set of seismic data; and migrating the beams resulting from the decomposition. In this aspect, decomposing an unmigrated set of seismic data, includes: windowing the initially migrated data set into a plurality of windows that sum to unity; applying a matching pursuit scheme by selecting a dominant dip in each of the windows; estimating a reconstructed dipping event for each selected dominant dip; and subtracting the estimated dipping event from the migrated data set.

Other aspects of the technique include a program storage medium encoded with instructions that, when executed by a processor, perform one or more of such methods or a computing apparatus programmed to perform one or more of such methods.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE SEVERAL VIEWS OF THE DRAWINGS

The invention will hereafter be described with reference to the accompanying drawings, wherein like reference numerals denote like elements, and.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The present invention includes a method and apparatus for processing seismic data to yield an improved data set which, in turn, will yield better results in a seismic data analysis. More particularly, the present invention is a technique for performing a fast residual migration of seismic data through parsimonious image decomposition. The technique includes, in various aspects and embodiments, a computer-implemented method, various apparatuses for use in implementing the method, and a seismic data set in which noise has been mitigated through performance of the method.

To achieve the goal of a parsimonious transform that is local in space and dip in accordance with the present invention, we start with a simple formulation. We define a window function, ø, that gives spatial locality, a local normal vector, n, that defines a direction of dip, and a 1-D wavelet, w, that describes the seismic data oscillations that are constant in the direction of the dip plane. For a single beam we then have:

$$d_i(x) = \phi_i(x) w_i(\hat{n}_i \cdot x)$$

where x is the distance from the beam center.

For a beam formation in prestack data this would be. Where the p's are slowness vectors in shot and receiver spaces and the x's are shot and receiver distances from the beam center:

$$d_i(x) = \phi_i(x) w_i(p_i^s \cdot x^s + p_i^r \cdot x^r).$$

Figure 2:
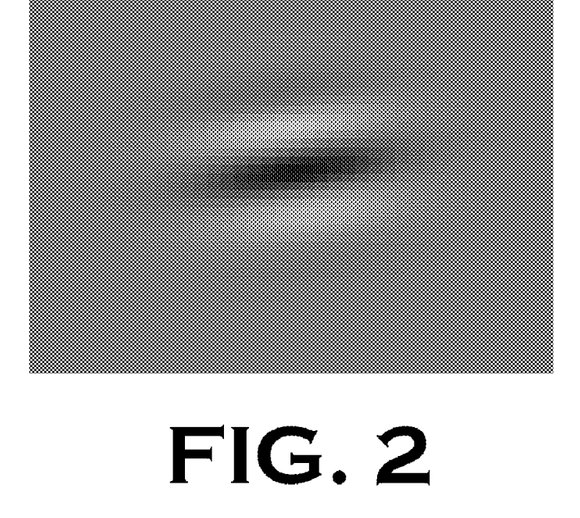
FIG. 2 depicts the wavefield associated with a single beam.

This is the subset of data represented by one beam. An example of the function associated with one beam is shown in FIG. 2. It has the form of a complex wavelet spread out along the dip and then tapered with the window function. For a practical problem the dictionary of window functions is given in advance. However the relationship between the data, the unknown normal vector, and the unknown wavelet is highly non-linear.

We seek to find the minimum number of beams that form a satisfactory approximation to the data. This is a large non-linear inverse problem that does not have a fast, perfect solution. However we do not need a perfect solution for this application we just need a "good enough" solution. There is a whole family of methods that fall in the category of "matching pursuit" schemes that can be used to solve this problem. The very simplest schemes use a large dictionary of non-orthogonal basis functions and test to see which basis has the biggest component in the data. That component is then subtracted from the data. Then we repeat to choose the next component, etc. until we are happy with the representation of the data. For spectral decomposition this approach is known as Prony's method.

As we have a continuously variable normal vector and continuously variable wavelet coefficients we have to use a more sophisticated variant of matching pursuit that combines an initial dictionary lookup with a descent method to find the best fitting pairs of normal parameters and wavelet parameters for each beam.

Because we have not discretized the dip we expect to have good estimates of dip for our migration process which leads to an improved image.

Although this decomposition process is much slower than some of the other alternatives we find that the beams produced by this approach give a more efficient migration.

Figure 1A:
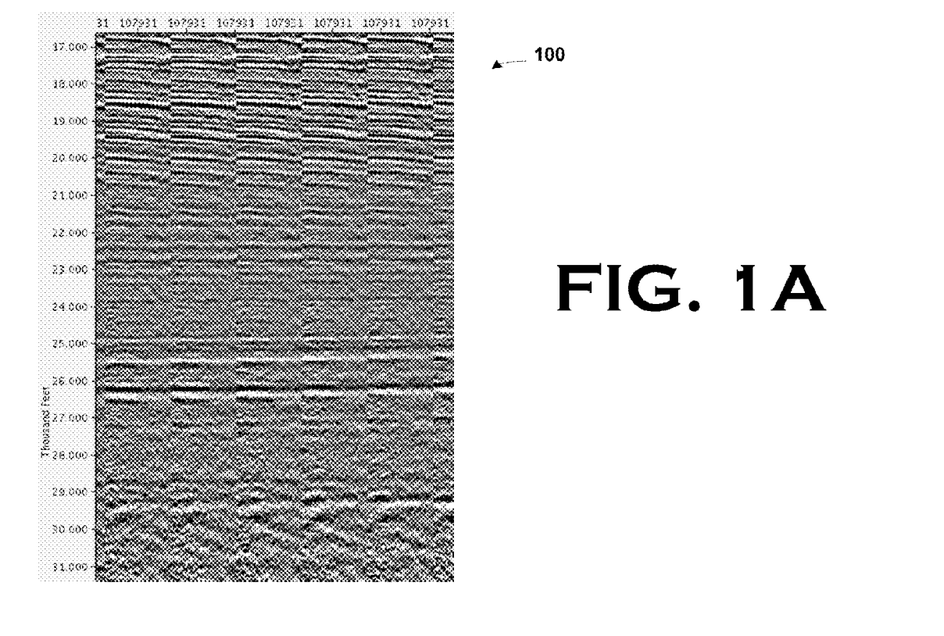
FIG. 1A-FIG. 1B depict common image point gathers of a single set of input seismic data using a full migration technique and rapid beam imaging fast migration technique, respectively.
Figure 1B:
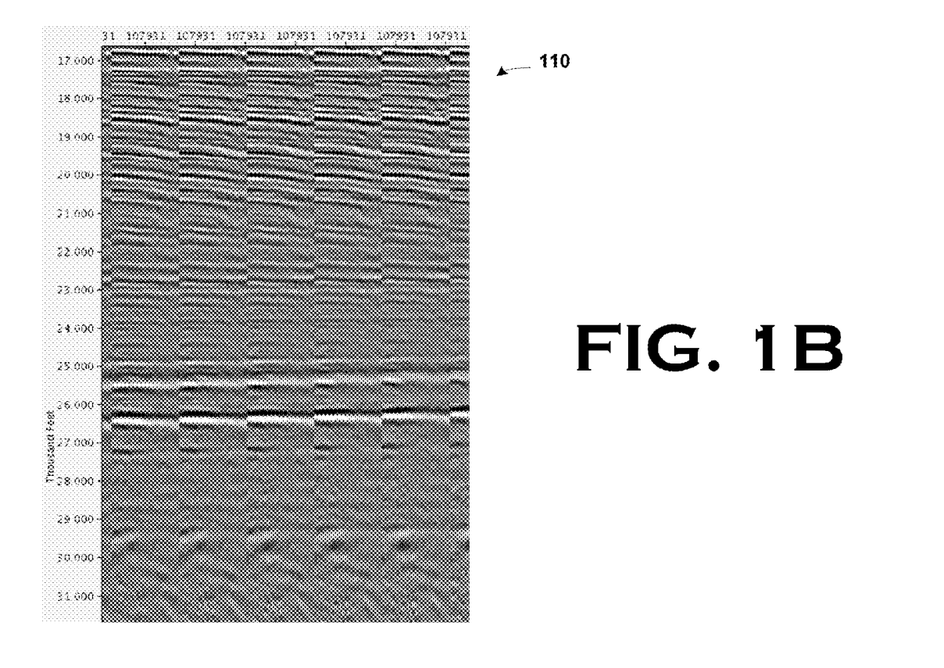

The common image point ("CIP") gathers shown in FIG. 1A and FIG. 1B were created by using this approach in the common offset domain. The gathers in FIG. 1A were produced by a full migration. The gathers in FIG. 1B were produced by rapid beam imaging in accordance with the present invention. Almost all of the significant moveout in the gathers is captured by the beam method at a significantly reduced cost. Each offset trace in a gather is the result of a separate decomposition process. The fact that the different offsets line up to give coherent events demonstrates that the beam formation is a stable process in the presence of consistent signal in the data. Although some fine detail may be lost in the image, this is an excellent input to a velocity model updating workflow.

Thus, parsimonious beam decomposition is a useful tool in creating fast migration algorithms. When multiple migration steps are to be run as part of a velocity model building process it is worth the extra effort to create a high quality decomposition. By using a non-linear set of basis function and a matching pursuit decomposition we obtain a sparse set of beams with high dip accuracy.

Figure 3:
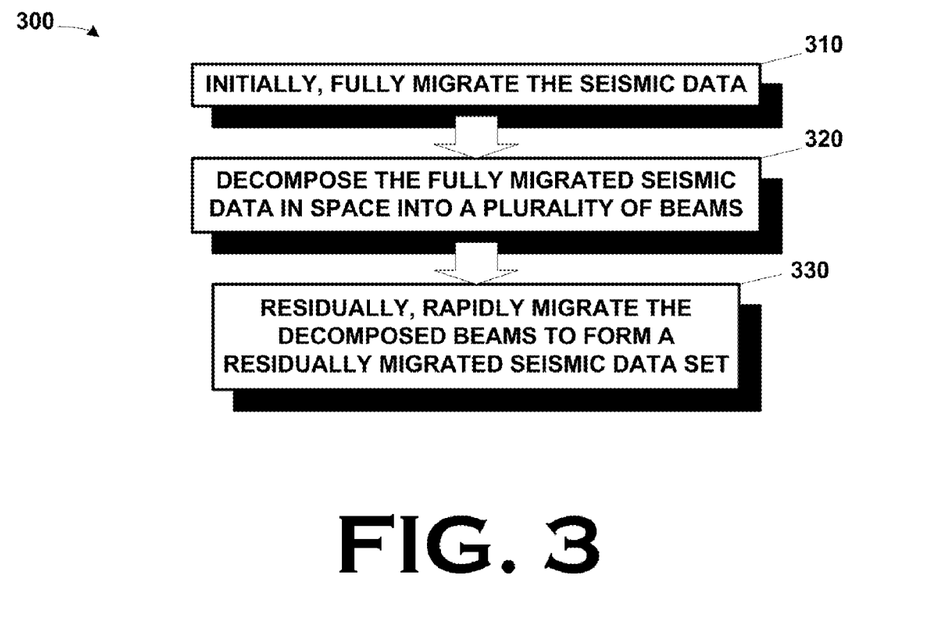
FIG. 3 illustrates one embodiment of a method practiced in accordance with a first aspect of the present invention.

To provide a fuller understanding of the present invention, one particular embodiment of a software-implemented method 300, shown in FIG. 3, in accordance with the present invention will now be discussed. The method 300 begins by initially, fully migrating (at 310) the seismic data of a seismic data, e.g., the seismic data set 100 shown in FIG. 1A. The fully migrated seismic data is then decomposing (at 320) in space into a plurality of beams. The decomposed beams are then residually, rapidly migrating (at 330) to form a residually migrated seismic data set, e.g., the seismic data set 110 in FIG. 1B.

Full migration of a seismic data set is well known in the art. A step in seismic processing in which reflections in seismic data are moved to their correct locations in the x-y-time space of seismic data, including two-way traveltime and position relative to shotpoints. Migration improves seismic interpretation and mapping because the locations of geological structures, especially faults, are more accurate in migrated seismic data. Proper migration collapses diffractions from secondary sources such as reflector terminations against faults and corrects bow ties to form synclines. There are numerous methods of migration, such as dip moveout ("DMO"), frequency domain, ray-trace and wave-equation migration. (Source: http://www.glossary.oilfield.slb.com/Display.cfm?Term=migration) A number of techniques are known to the art and any suitable technique may be used for the full migration (at 310).

Note that decomposition (at 320) occurs after the initial full migration (at 310) in this particular embodiment. Before migration, there may be many dips in any space time window. Elements of a dip may move a long way, resulting in a big aperture. Dips furthermore have a well defined range and even point scatterers are smooth events (diffractions). After migration, there are fewer "dominant" dips (discussed further below) in a window. The fully migrated seismic data exhibits improved signal to noise. Elements of dip move a short way, resulting in a smaller aperture and point scatters are "all dip" and will not be recovered.

Although there are a number of decomposition techniques known to the art, the present invention departs from conventional practice in decomposing (at 320) the fully migrated seismic data. The present invention does not decompose the entire seismic volume into targeted "diplets" or "beamlets"— only dips that are of interest are selected. Such selected dips are used for further migration/demigration using residual migration methods. The remaining data volume is not involved. The selective or partial migration/de-migration greatly reduces the cost and time of migration. While some elements such as residual migration, beam migration, decomposition, and such are individually known in the art, the present invention compares the seismic data, choosing a locally un-optimized method to achieve an overall faster migration. The present invention also permits one to quantitatively trade-off between the speed and quality in a manner not found in conventional practice.

Figure 4:
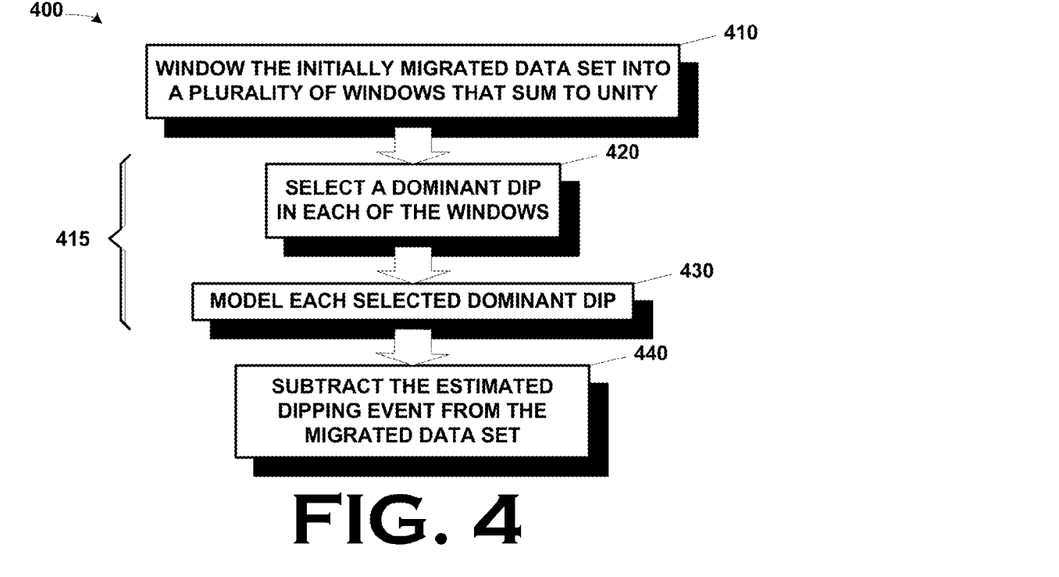
FIG. 4 illustrates the decomposition in one implementation in the embodiment of FIG. 3.

The present decomposition technique 400 is illustrated in FIG. 4. The decomposition of the present invention is performed in space, and there are a number of reasons for this. For example, not all dips are present at all locations and it is more efficient to avoid imaging the dips that are not present. The decomposition technique 400 begins by windowing (at 410) the initially migrated data set into a plurality of windows that sum to unity. Then it uses a two stage matching pursuit method (at 415). The first step is to select (at 420) a dominant dip in each of the windows and the second step estimates (at 430) each selected dominant dip. The estimate (at 430) is performed by estimating the wavelet along the dip. The decomposition technique 400 then subtracts the estimated dip from the migrated data set. The end result of the decomposition technique is the center of the beam, the dip of the beam, the wavelet (or, "beamlet").

Figure 5:
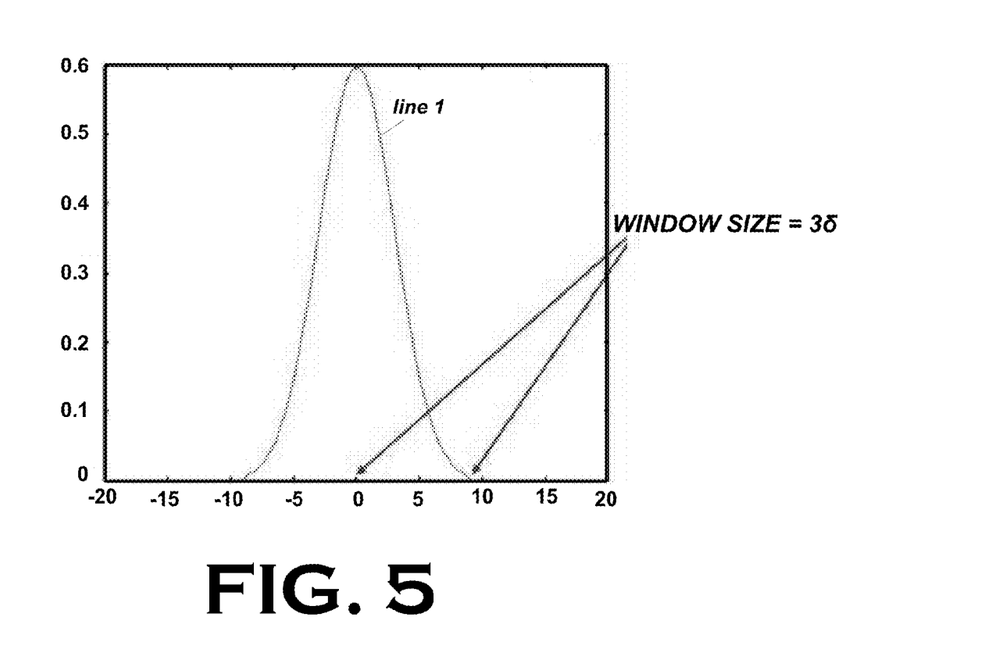
FIG. 5 illustrates the window size definition for the decomposition of FIG. 4.
Figure 6A:
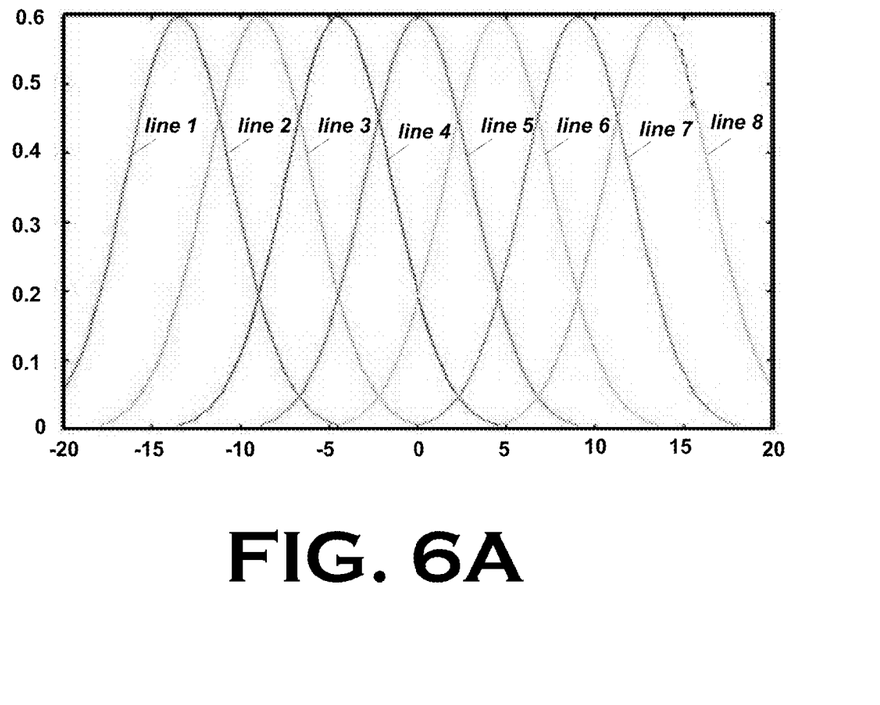
FIG. 6A-FIG. 6B illustrate the overlap among windows in the decomposition of FIG. 4.
Figure 6B:
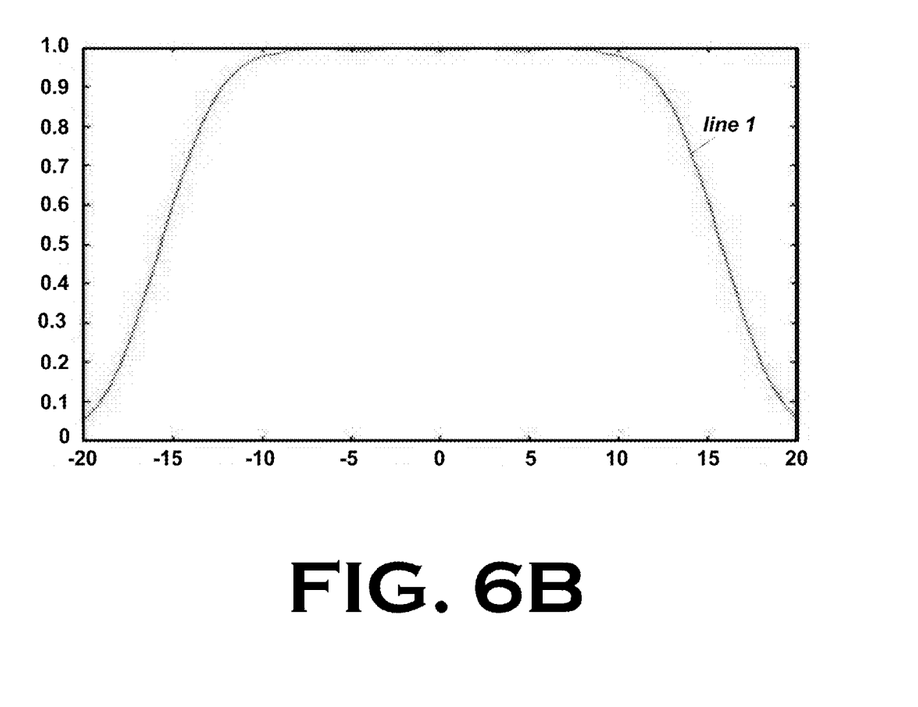

The present decomposition (at 320) windows (at 410) the initially, fully migrated seismic data so that there are only a few dips in each window. The windows are selected so that adding them back together reconstructs the data, that is, they sum to unity. If these windows are independently processed, then a lot of parallelism is available. The windows are defined using a Gaussian taper and are sized, as shown in FIG. 5, three times that of the applied Gaussian taper. As is illustrated in FIG. 6A-FIG. 6B, the windows overlap in this particular embodiment and the step size between window is one-quarter the window size. This overlap provides quadruple redundancy in one dimension and 64 times redundancy in three dimensions.

Figure 7:
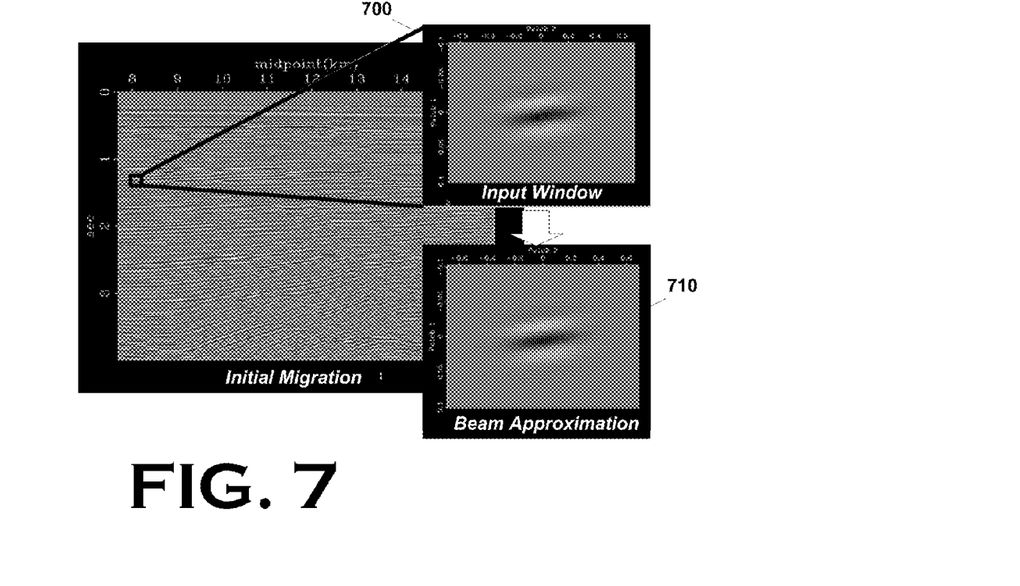
FIG. 7 depicts one particular input to the embodiment of FIG. 3, the extraction of a window, and the results of the decomposition of the window.

Once the seismic data set is windowed (at 410), each window is serially extracted and processed with remaining steps (at 420-440) of the decomposition technique. FIG. 7 conceptually illustrates the extraction of a single window 700. Thus, the dominant dip selection (at 420), the dominant dip estimating (at 430), and the matching pursuit scheme application (at 440) are performed for each window in serial.

The decomposition technique 400 includes (at 420) selecting a "dominant" dip. The dominant dip is, in this sense, is the event within the window that exhibits the greatest drop in energy. The information associated with the dip may vary, and may include the dip location, orientation, source/receiver, and wavelet. In the illustrated embodiment, the dip does not include coherency.

Figure 8A:
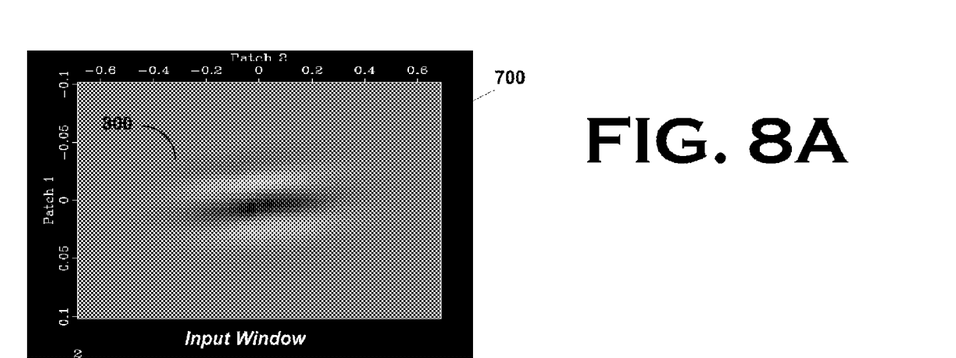
FIG. 8A-FIG. 8B illustrate the decomposed window of FIG. 7 in greater detail.
Figure 8B:
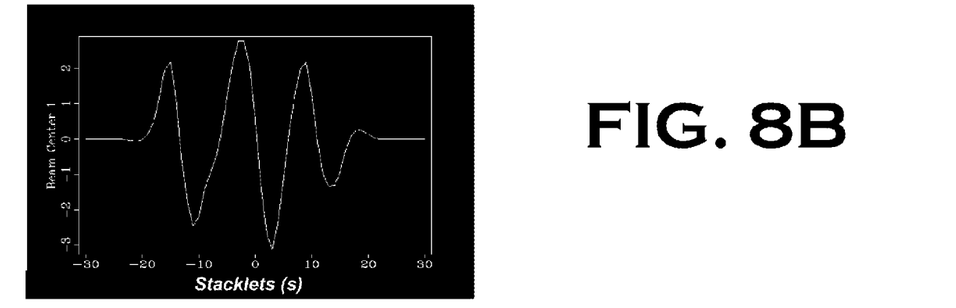

Some windows may contain only one dip while some may contain multiple dips. Consider, for example, the window 700 first shown in FIG. 7 and better shown in FIG. 8A. FIG. 8B presents an example of the trace w in the above formula—i.e., the one-dimensional trace that is spread along the dip and tapered. The window 700 contains only a single dipping event 800, and it accordingly is the "dominant" dip of the window 700. A number of techniques may be used for selecting the "dominant" dip, including applying a least squares estimator, a singular valued decomposition ("SVD")-based method, or a curvelet decomposition on a fixed set of dips. Alternatively, one may apply a summation along the possible dips, picking the dip with the largest energy in the sum and then estimating the exact peak energy dip by interpolating between the sampled dips. The illustrated embodiment uses the least squares estimator.

The beam associated with the dominant dip is then estimated (at 430) for each window. The estimation includes spreading the one-dimensional trace along the dipping event and applying the Gaussian taper. Then, a least squares fit is solved to find the one-dimensional trace that maximized the match of the modeled beam to the windowed data. In three dimensions, this is done by spreading a one-dimensional trace into a 3D cube and applying a 3D taper. Note that the 3D cube is compressed—that is, the storage for all the beams is smaller than the storage of the original data.

A matching pursuit scheme is then applied to the modeled dominant dip. The illustrated embodiment, more particularly, applies a Prony's method. Matching pursuit schemes are known in the computational arts, and Prony's method is but one example suitable for implementing the present invention. These kinds of techniques are sufficiently known art that discourses on them are publicly available. One such discourse directed specifically to the Prony's method may be found at http://en.wikipedia.org/wiki/Prony%27s_method. Note, however, that alternative embodiments may use alternative matching pursuit schemes. For example, some alternative embodiments may use single-step matching pursuit schemes.

Figure 9:
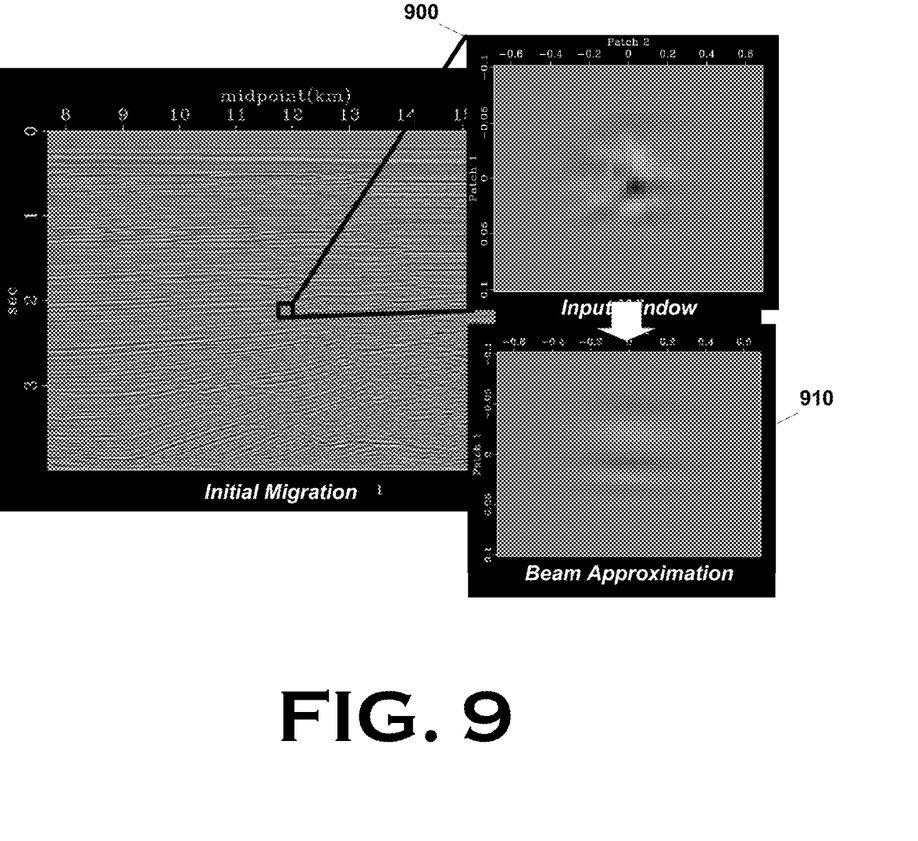
FIG. 9 depicts the particular input of FIG. 7 to the embodiment of FIG. 3, the extraction of a second window, and the results of the decomposition of the second window.
Figure 10A:
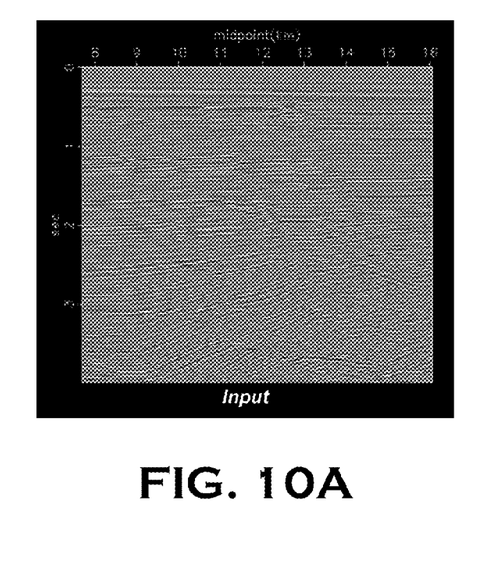
FIG. 10A-FIG. 10C illustrate the effect of the decomposition in FIG. 3 in greater detail, FIG. 10A being an input and FIG. 10B being processed one dip approximation, and FIG. 10C being a processed two dip approximation.
Figure 10B:
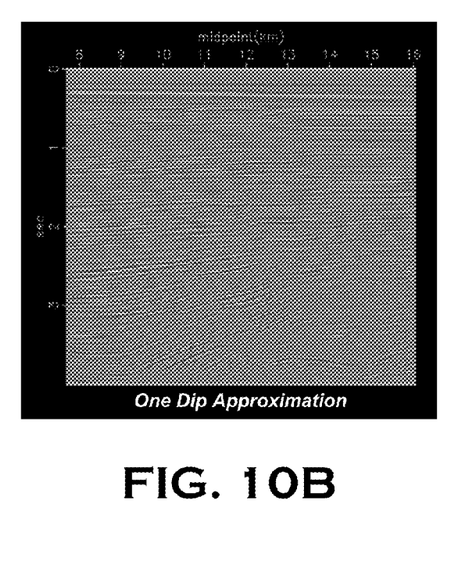
Figure 10C:
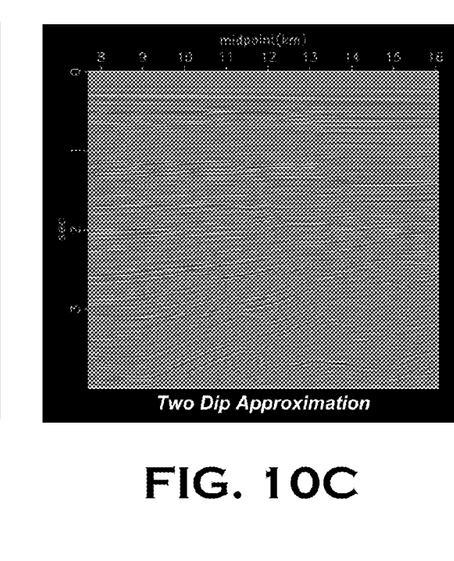

FIG. 7 shows a processed window 710, which is the window 700 processed as described above. FIG. 9 shows the result of the decomposition technique described above on another window 900 in the same seismic data set, the result being shown in the processed window 910. FIG. 10A-FIG. 10C illustrate the effect in greater detail, FIG. 10A being an input and FIG. 10B being processed one dip approximation, and FIG. 10C being a processed two dip approximation.

Note also that the process of decomposing the seismic data set and residually migrating will typically be iterated upon the residual migrated seismic data from the previous iteration.

In the embodiment discussed above, the windows were of uniform size, thereby resulting in uniformly sized beams. However, alternative embodiments may vary the lengths of the beams. Some of these embodiments may be referred to as employing "nested beams", or beams of "nested scales." This is performed over several iterations. So, this embodiment begins by initially, fully migrating the seismic data set, decomposing the seismic data set as described above, then residually migrating the decomposed seismic data to achieve a residually migrated seismic data set. The process is repeated on the residually migrated seismic data set using differently sized windows to yield differently sized beams during the decomposition before another residual migration is performed. This is repeated until the desired results are obtained.

In the illustrated embodiment, the entire, residual data set is migrated. However, alternative embodiments may choose to migrate only selected portions, e.g., the portions for which the residual has been determined. (Note that not every window will have a residual determined in the illustrated embodiment. Only those having dips also have their residuals determined.)

Furthermore, in the illustrated embodiment, the decomposed seismic data is stored as a beam center, a beam dip, and a wavelet (or, "beamlet") for each window that is decomposed. The decomposed seismic data can then be applied to a variety of velocity models in subsequent residual migrations without the need to decompose for each residual migration.

The residually migrated data can be used to give input to a velocity model building process, e.g. by picking the moveout of the events as a function of offset. This would normally be done on the result of a complete migration but it can be done more efficiently by using the result of the residual migration. The image formed from the residually migrated data can be used as a "quick look" migration to give the user a preview of the image that would be obtained from a full migration using the new velocity model.

As noted above, the technique disclosed herein is software-implemented. Thus, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 11:
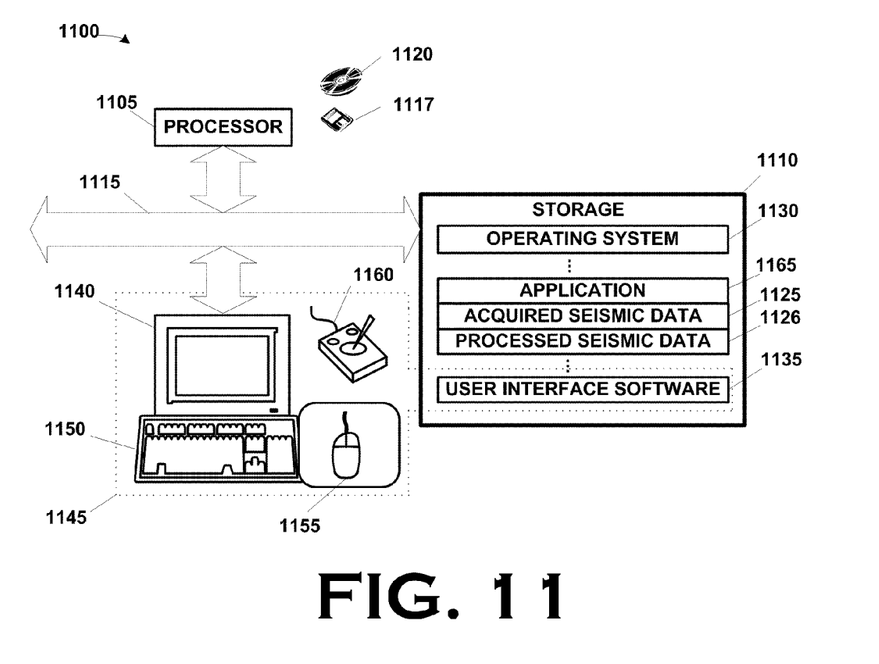
FIG. 11 depicts an apparatus on which one particular embodiment of the present invention may be practiced.

Turning now to FIG. 11, it shows selected portions of the hardware and software architecture of a computing apparatus 1100 such as may be employed in some aspects of the present invention. The computing apparatus 1100 includes a processor 1105 communicating with storage 1110 over a bus system 1115. The storage 1110 may include practically any type of medium, including a hard disk and/or random access memory ("RAM") and/or removable storage such as a floppy magnetic disk 1117 and an optical disk 1120.

The storage 1110 is encoded with the acquired seismic data 1125 and, during and upon execution of the method, the processed seismic data 1126. The acquired seismic data 1125 may have been previously acquired in any suitable manner known to the art. For example, the acquired seismic data may have been acquired in either a marine survey or a land survey. The acquired seismic data 1125 and processed seismic data 1126 may be stored using any suitable data structure known to the art. The data structure will typically be, for example, a flat file or a text delimited file. However, acceptable alternatives include structures such as a database, a list, a tree, a table, etc. The invention is not limited by the manner in which the acquired seismic data 1125 and the processed seismic data 1126 are stored.

The storage 1110 is also encoded with an operating system 1130, user interface software 1135, and an application 1165. The user interface software 1135, in conjunction with a display 1130, implements a user interface 1145. The user interface 1145 may include peripheral I/O devices such as a keypad or keyboard 1150, a mouse 1155, or a joystick 1160. The processor 1105 runs under the control of the operating system 1130, which may be practically any operating system known to the art.

The application 1165, when invoked, performs the method of the present invention. The user may invoke the application in conventional fashion through the user interface 1145. As previously noted, in one aspect, the present invention includes a computer-implemented method, such as the method 300 of FIG. 3. In another aspect, the invention includes a computing apparatus such as the computing apparatus 1100 of FIG. 11, programmed to perform such a method. In still another aspect, the invention includes a program storage medium such as the optical disk 1120, encoded with instructions that, when executed by a computing apparatus, performs a method such as the method 300.

Note that there is no need for the multicomponent seismic data 1125 to reside on the same computing apparatus 1100 as the application 1165 by which it is processed. Some embodiments of the present invention may therefore be implemented on a distributed computing apparatus. Consider, e.g., the computing system 1200 in FIG. 12, comprising more than one computing apparatus. For example, the multicomponent seismic data 1125 may reside in a data structure residing on a server 1203 and the application 1165 by which it is processed on a workstation 1206 where the computing system 1200 employs a networked client/server architecture. Furthermore, although the acquired multicomponent seismic data 1125 is shown residing on the server 1203 with the processed multicomponent seismic data 1126, there is no requirement that they reside together.

Figure 12:
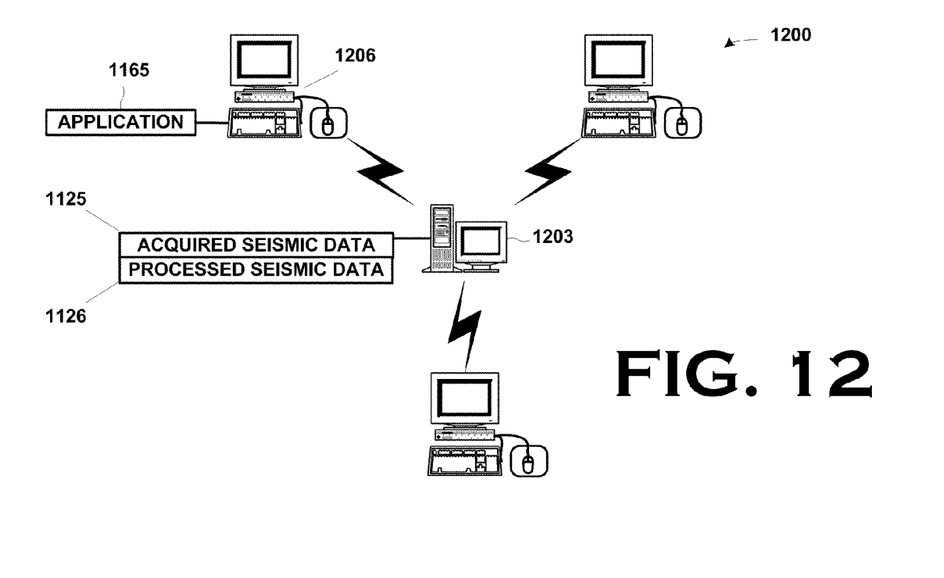
FIG. 12 depicts a distributed computing system on which some aspects of the present invention may be practiced in embodiments alternative to that shown in FIG. 11.

However, there is no requirement that the computing system 1400 be networked. Alternative embodiments may employ, for instance, a peer-to-peer architecture or some hybrid of a peer-to-peer and a client/server architecture. The size and geographic scope of the computing system 1400 is not material to the practice of the invention. The size and scope may range anywhere from just a few machines of a Local Area Network ("LAN") located in the same room to many hundreds or thousands of machines globally distributed in an enterprise computing system.

Thus, as discussed above, rapid beam migration includes the decomposition of seismic data into a set of beams. Beams are functions that are local in space and dip. The sum of all the beams is a good approximation of the input data and the technique migrates the beams to create a good approximation of the final image. The present invention incurs the cost of a more expensive beam decomposition that results in a parsimonious set of beams with high dip accuracy.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

I claim:

1. A software-implemented method for processing a set of seismic data for seismic exploration, comprising:
   initially migrating the seismic data;
   decomposing the fully migrated seismic data in space into a plurality of beams;
   residually migrating the decomposed beams to form a residually migrated seismic data set; and
   wherein the initially migrating, decomposing, and residually migrating are performed by a processor.

2. The software-implemented method of claim 1, wherein decomposing the migrated seismic data in space includes:
- windowing the initially migrated data set into a plurality of windows that sum to unity;
- applying a matching pursuit scheme by selecting a dominant dip in each of the windows;
- estimating a reconstructed dipping event for each selected dominant dip; and
- subtracting the estimated dipping event from the migrated data set.

3. The software-implemented method of claim 2, wherein the window size is three times that of a Gaussian taper applied to define the windows.

4. The software-implemented method of claim 2, wherein selecting the dominant dip includes:
- applying a least squares estimator;
- applying a singular valued decomposition-based method;
- applying a curvelet decomposition on a fixed set of dips; or
- applying a summation along the possible dips, picking the dip with the largest energy in the sum and then estimating the exact peak energy dip by interpolating between the sampled dips.

5. The software-implemented method of claim 2, wherein modeling the dominant dipping event includes:
- modeling a dipping event as a one-dimensional trace spread along the dip;
- apply the given spatial window function to the modeled dipping event; and
- solving a least squares fit to find the one-dimensional trace that maximized the match of to the modeled dipping event to the windowed input data.

6. The software-implemented method of claim 2, wherein applying the matching pursuit scheme includes, after picking the first dip in each window:
- taking the residual data from the process; and
- picking further dips in a new set of windows.

7. The software-implemented method of claim 2, wherein decomposing the migrated seismic data in space includes decomposing the migrated seismic data at nested scales.

8. The software-implemented method of claim 1, further comprising iterating the residual migration of the decomposed beams.

9. The software-implemented method of claim 1, further comprising:
- updating a plurality of gathers; and
- stacking the gathers.

10. A program storage medium encoded with instructions that, when executed by a computing device, performs a method comprising:
- initially migrating the seismic data;
- decomposing the fully migrated seismic data in space into a plurality of beams; and
- residually migrating the decomposed beams to form a residually migrated seismic data set.

11. The program storage medium of claim 10, wherein decomposing the migrated seismic data in space in the method includes:
- windowing the initially migrated data set into a plurality of windows that sum to unity;
- applying a matching pursuit scheme by selecting a dominant dip in each of the windows;
- estimating a reconstructed dipping event for each selected dominant dip; and
- subtracting the estimated dipping event from the migrated data set.

12. The program storage medium of claim 10, wherein the method further comprises iterating the residual migration of the decomposed beams.

13. A computing apparatus for seismic exploration, comprising:
- a processor;
- a storage communicating with the processor;
- a set of seismic data residing on the storage; and
- a software component residing on the storage that, when invoked by the processor, performs a method for processing the seismic data, the method including:
  - initially migrating the seismic data;
  - decomposing the fully migrated seismic data in space into a plurality of beams; and
  - residually migrating the decomposed beams to form a residually migrated seismic data set.

14. The computing apparatus of claim 13, wherein decomposing the migrated seismic data in space in the method includes:
- windowing the initially migrated data set into a plurality of windows that sum to unity;
- applying a matching pursuit scheme by selecting a dominant dip in each of the windows;
- estimating a reconstructed dipping event for each selected dominant dip; and
- subtracting the estimated dipping event from the migrated data set.

15. The computing apparatus of claim 13, wherein the method further comprises iterating the residual migration of the decomposed beams.

16. A software-implemented method for decomposing migrated seismic data in space for seismic exploration, comprising:
- windowing the initially migrated data set into a plurality of windows that sum to unity;
- applying a matching pursuit scheme by selecting a dominant dip in each of the windows;
- estimating a reconstructed dipping event for each selected dominant dip;
- subtracting the estimated dipping event from the migrated data set; and
- wherein the windowing, applying, estimating, and subtracting are performed by a processor.

17. The software-implemented method of claim 16, wherein selecting the dominant dip includes:
- applying a least squares estimator;
- applying a singular valued decomposition-based method;
- applying a curvelet decomposition on a fixed set of dips; or
- applying a summation along the possible dips, picking the dip with the largest energy in the sum and then estimating the exact peak energy dip by interpolating between the sampled dips.

18. The software-implemented method of claim 16, wherein modeling the dominant dip includes:
- modeling a dipping event as a one-dimensional trace spread along the dipping event;
- apply the given spatial window function to the modeled dipping event; and
- solving a least squares fit to fin the one-dimensional trace that maximized the match of to the modeled dipping event to the windowed input data.

19. The software-implemented method of claim 16, wherein applying the matching pursuit scheme includes, after picking the first dip in each window:
- taking the residual data from the process; and
- picking further dips in a new set of windows.

20. The software-implemented method of claim 16, wherein decomposing the migrated seismic data in space includes decomposing the migrated seismic data at nested scales.

21. A program storage medium encoded with instructions that, when executed by a computing device, perform a method for decomposing migrated seismic data in space, the method comprising:
- windowing the initially migrated data set into a plurality of windows that sum to unity;
- applying a matching pursuit scheme by selecting a dominant dip in each of the windows;
- estimating a reconstructed dipping event for each selected dominant dip; and
- subtracting the estimated dipping event from the migrated data set.

22. The program storage medium of claim 20, wherein selecting the dominant dip in the method includes:
- applying a least squares estimator;
- applying a singular valued decomposition-based method;
- applying a curvelet decomposition on a fixed set of dips; or
- applying a summation along the possible dips, picking the dip with the largest energy in the sum and then estimating the exact peak energy dip by interpolating between the sampled dips.

23. The program storage medium of claim 20, wherein modeling the dominant dip in the method includes:
- modeling a dipping event as a one-dimensional trace spread along the dipping event;
- apply the given spatial window function to the modeled dipping event; and
- solving a least squares fit to fin the one-dimensional trace that maximized the match of to the modeled dipping event to the windowed input data.

24. A computing apparatus for seismic exploration, comprising:
- a processor;
- a storage communicating with the processor;
- a set of migrated seismic data residing on the storage; and
- a software component residing on the storage that, when invoked by the processor, performs a method for decomposing the migrated seismic data in space, the method including:
  - windowing the initially migrated data set into a plurality of windows that sum to unity;
  - applying a matching pursuit scheme by selecting a dominant dip in each of the windows;
  - estimating a reconstructed dipping event for each selected dominant dip; and
  - subtracting the estimated dipping event from the migrated data set.

25. The computing apparatus of claim 23, wherein selecting the dominant dip in the method includes:
- applying a least squares estimator;
- applying a singular valued decomposition-based method;
- applying a curvelet decomposition on a fixed set of dips; or
- applying a summation along the possible dips, picking the dip with the largest energy in the sum and then estimating the exact peak energy dip by interpolating between the sampled dips.

26. The computing apparatus of claim 23, wherein modeling the dominant dip in the method includes:
- modeling a dipping event as a one-dimensional trace spread along the dipping event;
- apply the given spatial window function to the modeled dipping event; and
- solving a least squares fit to fin the one-dimensional trace that maximized the match of to the modeled dipping event to the windowed input data.

27. The computing apparatus of claim 23, wherein applying the matching pursuit scheme in the method includes, after picking the first dip in each window:
- taking the residual data from the process; and
- picking further dips in a new set of windows.

28. The computing apparatus of claim 23, wherein decomposing the migrated seismic data in space in the method includes decomposing the migrated seismic data at nested scales.

* * * * *